US010908328B2

(12) United States Patent
Aikin et al.

(10) Patent No.: US 10,908,328 B2
(45) Date of Patent: Feb. 2, 2021

(54) RETROREFLECTORS

(71) Applicant: Apple Inc., Cupertino, CA (US)

(72) Inventors: Randol W. Aikin, Sunnyvale, CA (US);
Malcolm J. Northcott, Felton, CA
(US); Daniel E. Potter, San Jose, CA
(US); Matthew E. Last, San Jose, CA
(US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 15/709,442

(22) Filed: Sep. 19, 2017

(65) Prior Publication Data

US 2018/0081094 A1   Mar. 22, 2018

Related U.S. Application Data

(60) Provisional application No. 62/397,001, filed on Sep. 20, 2016.

(51) Int. Cl.
*G02B 5/122* (2006.01)
*G02B 5/124* (2006.01)
(Continued)

(52) U.S. Cl.
CPC .............. *G02B 5/124* (2013.01); *B60R 13/10* (2013.01); *G01S 7/481* (2013.01); *G01S 7/4811* (2013.01); *G01S 13/75* (2013.01); *G01S 17/06* (2013.01); *G01S 17/74* (2013.01); *G01S 17/931* (2020.01); *G02B 5/128* (2013.01); *G02B 5/13* (2013.01); *G05D 1/024* (2013.01); *G05D 1/028* (2013.01); *G05D 1/0236* (2013.01);
(Continued)

(58) Field of Classification Search
CPC .......... G02B 5/124; G02B 5/13; G02B 5/128;
H01Q 1/3233; H01Q 15/14; H01Q 15/18;
G08G 1/166; G08G 1/017; G08G
1/09623; G08G 1/095; B60R 13/10;
G01S 7/481; G01S 17/74; G01S 17/936;
G01S 17/06; G01S 7/4811; G01S 13/931;
G01S 2013/9339; G01S 13/75; G05D
1/028; G05D 1/0242; G05D 1/024; G05D
1/0236
USPC ....................................................... 359/529
See application file for complete search history.

(56) References Cited

U.S. PATENT DOCUMENTS

| 4,149,304 | A  | * | 4/1979 | Brynjegard | ............ | B21D 13/04 |
| | | | | | | 29/895.3 |
| 6,275,145 | B1 | * | 8/2001 | Rogozinski | .......... | B60Q 1/0023 |
| | | | | | | 340/425.5 |
| 2012/0099199 | A1 | | 4/2012 | Vasylyev | | |

FOREIGN PATENT DOCUMENTS

| DE | 10333732 | 12/2004 |
| EP | 2187239 | 5/2010 |

(Continued)

*Primary Examiner* — Euncha P Cherry
(74) *Attorney, Agent, or Firm* — Robert C. Kowert; Kowert, Hood, Munyon, Rankin & Goetzel, P.C.

(57) ABSTRACT

A retroreflector system including an outer body panel coupled to a vehicle, wherein the outer body panel is configured to allow a radar signal originating from an external radar device to pass through the outer body panel. The retroreflector system also includes a plurality of retroreflectors embedded in the vehicle, where the plurality of retroreflectors is configured to reflect the signal to the external signal source as a reflected signal, and where the plurality of retroreflectors is configured to have a peak reflectivity for a radar wavelength range or a light detection and ranging (lidar) wavelength range.

15 Claims, 7 Drawing Sheets

(51) Int. Cl.
*G01S 17/74* (2006.01)
*G01S 7/481* (2006.01)
*H01Q 1/32* (2006.01)
*G01S 13/75* (2006.01)
*H01Q 15/18* (2006.01)
*G02B 5/128* (2006.01)
*G08G 1/095* (2006.01)
*G08G 1/0962* (2006.01)
*G02B 5/13* (2006.01)
*B60R 13/10* (2006.01)
*G08G 1/017* (2006.01)
*G08G 1/16* (2006.01)
*H01Q 15/14* (2006.01)
*G01S 17/931* (2020.01)
*G01S 17/06* (2006.01)
*G05D 1/02* (2020.01)
*G01S 13/931* (2020.01)

(52) U.S. Cl.
CPC ........... *G05D 1/0242* (2013.01); *G08G 1/017* (2013.01); *G08G 1/095* (2013.01); *G08G 1/09623* (2013.01); *G08G 1/166* (2013.01); *H01Q 1/3233* (2013.01); *H01Q 15/14* (2013.01); *H01Q 15/18* (2013.01); *G01S 13/931* (2013.01); *G01S 2013/9329* (2020.01)

(56) References Cited

FOREIGN PATENT DOCUMENTS

FR          2913934        9/2008
JP          2000103283     4/2000

\* cited by examiner

RETROREFLECTORS

This application claims benefit of priority to U.S. Provisional Application No. 62/397,001, filed Sep. 20, 2016, titled "Retroreflectors," which is hereby incorporated by reference in its entirety.

BACKGROUND

Visibility of vehicles on the road is paramount to safety of drivers. In low visibility conditions (e.g., fog, dust, snow or smog), a driver's inability to see other vehicles or road hazards increases the risk of a collision. Vehicles can mitigate the risk of collision by utilizing additional systems such as radar systems, vision-based cameras and light detection and ranging (LiDAR) cameras. Certain road or weather conditions can affect the effectiveness of these systems, such as water vapor absorbing or scattering light, thereby reducing proper detection of vehicles. The effectiveness of these systems can be improved by improving detectability of the vehicles.

SUMMARY

A retroreflector system that includes a plurality of retroreflectors is disclosed herein. The plurality of retroreflectors is configured to reflect a radar signal, a light, a lidar signal, or any other type of signal to a respective signal source. The plurality of retroreflectors may be at least partially embedded in an outer body panel of a vehicle. The outer body panel is configured to allow the radar signal to pass through to the plurality of retroreflectors.

DETAILED DESCRIPTION

Figure 1:
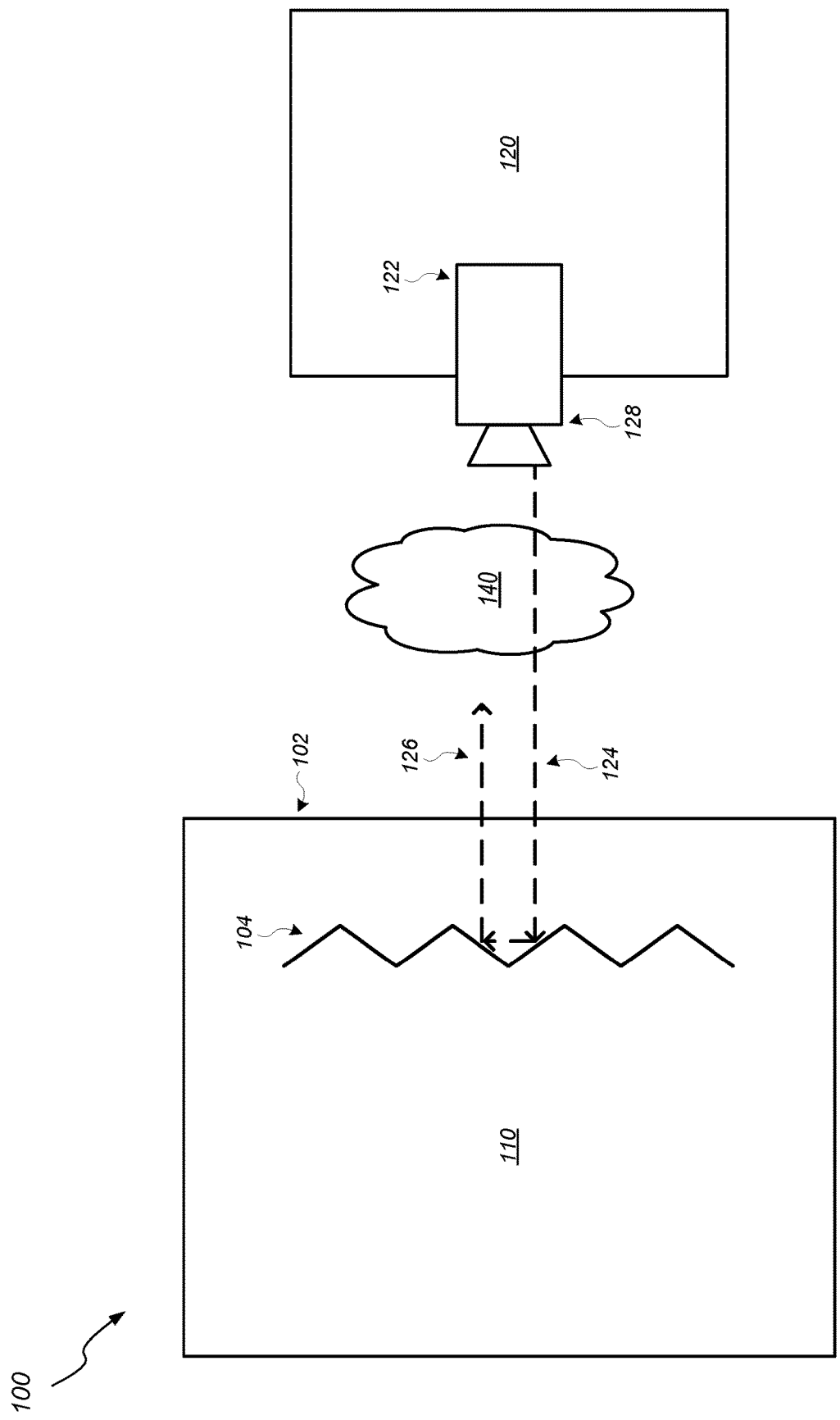
FIG. 1 illustrates a schematic diagram of a plurality of retroreflectors configured to reflect a signal.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

FIG. 1 illustrates a schematic diagram of a retroreflector system 100, which may include an outer body panel 102 and a plurality of retroreflectors 104. The outer body panel 102 may be coupled to or embedded in a vehicle 110. The plurality of retroreflectors 104 may be at least partially embedded in the outer body panel 102. The plurality of retroreflectors 104 may alternatively be fully embedded in an assembly positioned behind the outer body panel 102. The plurality of retroreflectors 104 may be configured to reflect a signal 124 from a signal source 122, such as another vehicle 120. In some embodiments, the signal source 122 may include a radar transmitter. In other embodiments, the signal source 122 may include a light ranging and detection (lidar) transmitter. The plurality of retroreflectors 104 may be configured to have a peak reflectivity for a radar wavelength range (e.g., 0.3-200 cm) or a lidar wavelength range (e.g., 780-1550 nm). In some embodiments, the retroreflector system 100 may be integral to the vehicle 110. In other embodiments, the retroreflector system 100 may be affixed to the vehicle 110 by an adhesive surface configured to adhere to the vehicle 110 at one or more locations. For example, the retroreflector system 100 may include an adhesive that may be used to affix the retroreflector system 100 to a bumper and/or a side portion of the vehicle 110.

In some embodiments, the retroreflector system 100 may be configured to reflect signals from all angles around the vehicle 110. For example, the retroreflector system 100 may have a spherical or round outer body portion 102 and a plurality of retroreflectors 104 arranged in a similar spherical or round orientation such that at least one retroreflector of the plurality of retroreflectors 104 may reflect the signal 124 irrespective to a position of the signal source 122 relative to the vehicle 110.

One or more of the plurality of retroreflectors 104 may be positioned in one or more locations around the vehicle 110 to improve non-optical visibility (e.g., radar or lidar visibility) to other vehicles, such as the vehicle 120. For example, a first subset of the plurality of retroreflectors 104 may be placed at a rear bumper of the vehicle 110. A second subset of the plurality of retroreflectors 104 may be placed at a front bumper of the vehicle 110. A third subset of the plurality of retroreflectors 104 may be placed at one or more sides of the vehicle 110. In another embodiment, the plurality of retroreflectors 104 may be placed in an elevated position, such as on a roof of the vehicle 110.

The outer body panel 102 may be configured to allow the signal 124 to pass through to the plurality of retroreflectors 104 with little to no disruption or distortion of the signal 124. The outer body panel 102 may be constructed or formed from a non-conductive material configured to minimize radio frequency or radar signal absorption. By minimizing absorption, the non-conductive material may effectively be transparent to the radio frequency or radar signal. Thus, the radio frequency or radar signal may pass through the non-conductive material with minimal degradation. The non-conductive material may be acrylonitrile butadiene styrene (ABS) plastic, polythene plastic, polyethylene plastic, polystyrene plastic, polyvinyl chloride plastic, a thermoplastic polymer, acrylic plastic, glass, or any combination thereof. In some embodiments, the outer body panel 104 may include a radar transparent fairing configured to be transparent to radio frequency or radar signals. The fairing may allow clean integration with a design or layout of the vehicle.

The signal 124 may include a radio detection and ranging (radar) signal, a light radar or light detection and ranging (lidar) signal, or any other type of signal. For example, the radar signal may include a radio frequency signal that is invisible to optical sensors or human vision. The lidar signal may include a near-infrared light signal that is substantially invisible to human vision while being detectable by optical sensors. The lidar signal may have a wavelength of approximately 780-1550 nm. The signal 124 may be sent from the signal source 122 to detect presence of objects, such as the vehicle 110. For example, a radar signal may be used by the vehicle 120 to detect the vehicle 110 in situations of low visibility. The vehicle 120 may be configured to determine a distance between the vehicle 120 and the vehicle 110 based on the signal 124 and the reflected signal 126. For example, the vehicle 120 may determine a distance traveled by the signal 124 and the reflected signal 126. The vehicle 120 may also determine a time from when the signal 124 is sent from the signal source 122 to when the reflected signal 126 is received by a signal sensor 128. In some embodiments, the signal sensor 128 may be integrated with the signal source 122. In other embodiments, the signal sensor 128 may be integrated with the vehicle 120 at a location different from the signal source 122. In some embodiments, the signal sensor 128 may be coupled to a plurality of retroreflectors to operate on two different wavelengths (e.g., radar and lidar wavelengths).

The plurality of retroreflectors 104 may be configured to reflect the signal 124 as a reflected signal 126. In some embodiments, the plurality of retroreflectors 104 may include a plurality of corner-cube reflectors configured to direct the reflected signal 126 in a direction that the signal 124 originated (e.g., toward the signal source 122). Visibility of the vehicle 110 by the vehicle 120 is improved when signals, such as the signal 124, sent from the vehicle 120 are reflected by the vehicle 110 as the reflected signal 126. The signal sensor 128 may receive or detect the reflected signal 126 after being reflected by the vehicle 110. In some embodiments, the plurality of retroreflectors 104 may be configured to append additional information to the signal 124 such that the reflected signal 126 includes the additional information, as described herein.

A corner-cube reflector may be formed by arranging a set of surfaces to form a corner of a cube. The set of surfaces may be perpendicular with respect to each of the surfaces. In some embodiments, three surfaces are used to form each corner-cube retroreflector. In other embodiments, the corner of the cube may be molded or shaped from a reflective material. The signal 124 may hit a first surface of the corner-cube reflector such that the signal 124 is reflected toward a second surface of the corner-cube reflector at a supplementary angle (i.e., an angle that would add up to 180° with another angle). For example, the signal 124 may hit the first surface at a first inward angle of 30° and be reflected toward the second surface at a first outward angle of 150° relative to the first surface. The signal 124 may be reflected to the second surface at a second inward angle based on the first outward angle. The signal 124 may be reflected from the second surface toward a third surface of the corner-cube reflector at a second outward angle that corresponds to another supplementary angle based on the second inward angle, which may be based on the first outward angle. The signal 124 may then be reflected from the third surface as the reflected signal 126 toward the signal source 122 at a third outward angle that is substantially similar to the first inward angle. In other words, the signal 124 sent from the signal source 122 is substantially parallel to the reflected signal 126.

The plurality of retroreflectors 104 may be configured to reflect the signal 124 differently based on the first inward angle in which the signal 124 approaches the plurality of retroreflectors 104. In some embodiments, the plurality of retroreflectors 104 may include a wavelength-dependent function may affect luminosity of the reflected signal 126 based on the inward angle. For example, the reflected signal 126 may be dimmer than the signal 124 when the inward angle exceeds a threshold angle. As described herein, the plurality of retroreflectors 104 may be configured to append data to the reflected signal 126. The plurality of retroreflectors 104 may alter or modify the appended data based on the inward angle. For example, the appended data may include information identifying the inward angle.

In some embodiments, the plurality of retroreflectors 104 may include one or more modulators configured to modulate the signal 124 received by at least one of the plurality of retroreflectors 104. Modulation may include adding a new signal (e.g., a digital bit stream or an analog signal) into an existing signal. In some embodiments, the one or more modulators may include one or more microelectromechanical systems (MEMS) configured to actively modulate the plurality of retroreflectors 104 to encode information to the signal 124 while minimizing power consumption for the encoding process. For example, the one or more MEMS may be configured to cause the plurality of retroreflectors to encode additional information in the reflected signal 126. In other embodiments, the one or more modulators may include active electrically controllable absorbers. For example, the active electrically controllable absorbers may be configured to absorb at least a portion of the signal 124 to affect the reflected signal 126. In some embodiments, the active electrically controllable absorbers may be controlled by one or more control elements to absorb or reduce reflectivity of the signal 124.

The plurality of retroreflectors 104 may be arranged in a particular pattern to convey information about the vehicle 110. In some embodiments, the plurality of retroreflectors 104 may have a first subset of retroreflectors enabled and a second subset of retroreflectors disabled. The arrangement of the first subset of retroreflectors and the second subset of retroreflectors may be similar to a one-dimensional barcode or two-dimensional barcode (e.g., a quick response or QR code). The vehicle 120 may read the barcode from the plurality of retroreflectors 104 on the vehicle 110 and search a database based on the barcode to retrieve information about the vehicle 110.

The plurality of retroreflectors 104 may be deployed or activated in a low visibility condition 140. For example, the low visibility condition 140 may include at least rain, fog, snow, dust storms, nighttime, or any condition where optical visibility is impaired. The vehicle 110 may include one or more environmental sensors configured to determine whether the low visibility condition 140 is present. Based on a determination that the low visibility condition 140 is present, the vehicle 110 may deploy the plurality of retroreflectors 104. In other embodiments, the plurality of retroreflectors 104 may be persistently deployed such that the plurality of retroreflectors 104 may reflect signals at all times.

The low visibility condition 140 may cause the signal 124 to be obstructed, diffused or otherwise degraded from reaching the vehicle 210. For example, when the low visibility condition 140 includes fog, the fog may cause a lidar signal or a visible light to diffuse and become unable to identify or illuminate the vehicle 110. However, the signal 124 may include a radar signal capable of reaching the vehicle 110. The radar signal may be configured at a wavelength such that the fog is effectively transparent to the signal 124.

The retroreflector system 100 may be integrated with a lighting system of the vehicle, in some embodiments. The lighting system may be a headlight assembly or a taillight assembly. The outer body panel 102 may be formed out of a clear or colored plastic material such that the lighting system may shine light through the outer body panel 102 at a particular color. The plurality of retroreflectors 104 may be adjusted based on its refractive index to better reflect radar signals than a plurality of optical reflectors. The plurality of optical reflectors are embedded in the lighting system and configured to reflect light from a light source of the vehicle in an outward direction. The plurality of optical reflectors may also be configured to reflect light from external light sources, such as other vehicles, to allow optical visibility of the vehicle 110 in situations where the light source is disabled or turned off. For example, the plurality of optical reflectors may include mirrors positioned proximate to lights on the vehicle 110 (e.g., headlights or taillights) or along sides of the vehicle 110 (e.g., along the bumper). In some embodiments, the plurality of retroreflectors 104 configured to reflect the signal 124, such as a radar signal, may be positioned behind the plurality of optical reflectors. For example, the plurality of optical reflectors may be positioned proximate to a taillight, and the plurality of retroreflectors 104 may be positioned within a body of the vehicle behind the plurality of optical reflectors such that the plurality of retroreflectors 104 are not visible through the plurality of optical reflectors. A light may reflect off of the plurality of optical reflectors without being able to reach or be reflected by the plurality of retroreflectors 104. The plurality of optical reflectors may be constructed from a non-conductive material, such as glass or plastics, as described herein, such that the signal 124 may pass through the plurality of optical reflectors to reach the plurality of retroreflectors 104.

The plurality of retroreflectors 104 may be included in a license plate coupled to the vehicle 110, in some embodiments. The plurality of retroreflectors 104 may be arranged to convey information about the vehicle 110 to outside entities, such as the vehicle 120. For example, the plurality of retroreflectors 104 may be configured to reflect the signal 124 at portions of the license plate where text is present and to absorb the signal 124 at portions of the license plate where text is not present. Alternatively, the plurality of retroreflectors 104 may be configured to append or encode a bit pattern in the signal 124 based on a standing wave interference pattern. For example, the plurality of retroreflectors 104 may include an interference pattern that adds information to the signal 124 to generate the reflected signal 126 that includes the information. In some embodiments, the plurality of retroreflectors 104 may be coupled to an optical element configured to encode the data to the reflected signal 126. For example, the optical element may include a liquid crystal display configurable to be switched on and off to pass bit information to the plurality of retroreflectors 104.

The signal source 122 may be included in a road infrastructure, a road sign, a streetlight, or any other landmark or device that is spatially aware, in some embodiments. For example, the road infrastructure may send out a signal 124 to detect the vehicle 110 driving along a road. The road infrastructure may be configured to perform analysis or some action based on detecting the vehicle 110. The road infrastructure may activate a road safety feature based on the vehicle 110 being present, such as enabling a warning light to warn the vehicle 110 about an upcoming road hazard.

In other embodiments, the outer body panel 102 and the plurality of retroreflectors 104 may be included in a road infrastructure, a road sign, a streetlight, or any other landmark or device that the vehicle 120 may need to detect for safety. The vehicle 120 may send a signal 124 to detect the presence of a road sign that may indicate an upcoming road hazard or turn in the road. For example, a driver of the vehicle 120 may have low optical visibility of the road sign, whereas a radar system of the vehicle 120 may not be limited by optical visibility of obstacles or landmarks proximate to the vehicle 120.

In embodiments where the signal 124 is a lidar signal (e.g., a near-infrared light-based signal), the outer body panel 102 may be optically transparent such that the signal 124 passes through the outer body panel 102 to the plurality of retroreflectors 104 without signal degradation due to the outer body panel 102. In other embodiments, the outer body panel 102 may include laser-drilled micro-perforations such that the signal 124 passes through the micro-perforations. The signal 124 may pass through the micro-perforations in embodiments where the outer body panel 102 is a material that would prevent the signal 124 from passing through to the plurality of retroreflectors 104. For example, the outer body panel 102 may be an opaque material that prevents a signal 124 (e.g., a lidar signal) from passing through to the plurality of retroreflectors 104. However, the signal 124 may pass through the outer body panel 102 via the micro-perforations such that the signal 124 may be reflected by the plurality of retroreflectors 104. The reflected signal 126 may pass through the outer body panel 102 via the micro-perforations after being reflected by the plurality of retroreflectors 104.

In some embodiments, the micro-perforations may be filled with pre-formed transparent plastic stakes to seal the micro-perforations while allowing the signal 124 to pass through without degradation. Alternatively, the micro-perforations may have a thermoplastic or a thermoformed optical-grade polymer injected during manufacturing of the outer body panel 102. The plurality of retroreflectors 104 may be directly coupled to the polymer such that an inner edge of the polymer may include at least a subset of the plurality of retroreflectors 104.

Figure 2:
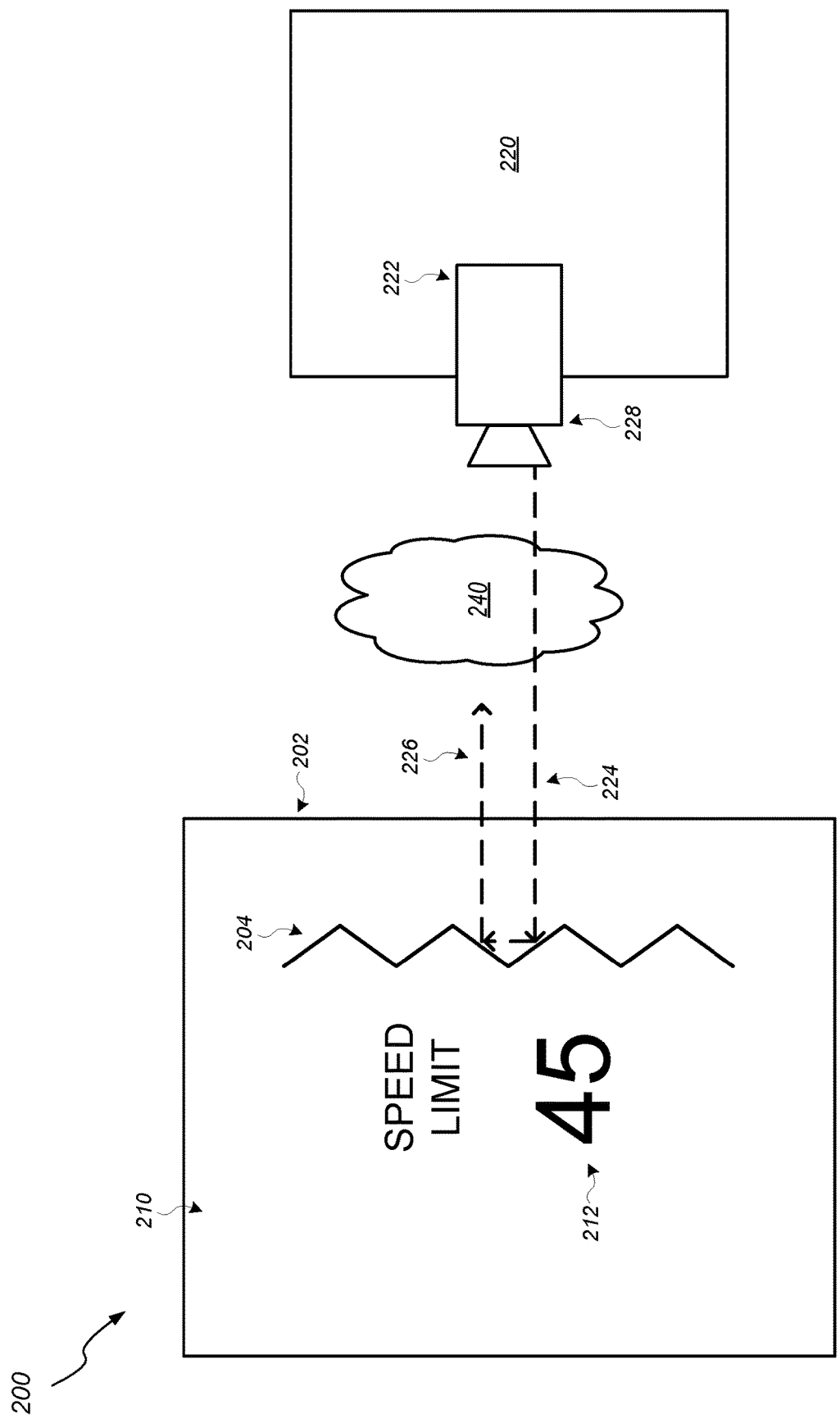
FIG. 2 illustrates a plurality of retroreflectors configured to reflect a signal in low visibility conditions.

FIG. 2 illustrates a retroreflector system 200 having a road sign 210 configured to provide information to a vehicle 220. The retroreflector system 200 may include an outer body panel 202 and a plurality of retroreflectors 204. The outer body panel 202 may be coupled to or embedded in a landmark, such as a road sign 210. The plurality of retroreflectors 204 may be at least partially embedded in the outer body panel 202. The plurality of retroreflectors 204 may alternatively be fully embedded in an assembly positioned behind the outer body panel 202. The plurality of retroreflectors 204 may be configured to reflect a signal 224 from a signal source 222, such as a vehicle 220.

The road sign 210 may include text 212 that indicates information that is useful to drivers, the information including, but not limited to, a speed limit, a stop sign, an advisory sign, a road condition warning, a distance marker, a restriction warning, a direction indicator, a street name, a route marker, a road identifier, a parking zone marker, an interest landmark, an emergency warning, a crosswalk sign, a school zone marker, a wildlife indicator, or any combination thereof. In some embodiments, the signal source 222 may include an optical sensor, such as a camera, to read the text 212 on the road sign 210. However, the camera may not be able to read the text 212 when a low visibility condition 240, such as fog, rain, snow, ice, nighttime, dirt, mud, a dust storm, haze, smog or any other visibly obstructive condition.

The signal source 222 may include a radar device configured to emit the signal 224. The signal 224 may include a radar signal which may include a radio frequency component. The low visibility condition 240 may be transparent to the radar signal based on the radio frequency component being configured to permeate physical or visual obstructions with little to no signal degradation.

The plurality of retroreflectors 204 may be configured with a standing wave interference pattern. The standing wave interference pattern may be shaped or controlled. For example, the standing wave interference pattern may be encoded to transmit a bit pattern that may indicate the text 212 on the road sign 210. The plurality of retroreflectors 204 may also be configured in a pattern such that a first subset of the plurality of retroreflectors 204 are enabled (e.g., configured to reflect the signal 224) while a second subset of the plurality of retroreflectors 204 are disabled (e.g., configured to not reflect the signal 224). In some embodiments, the first subset may correspond to the text 212 such that retroreflectors beneath the text 212 are enabled, and the second subset may correspond to white space on the road sign 210 are disabled. Thus, the first subset may permit the signal 224 to be reflected only in portions where the text 212 is physically present to allow the shape and pattern of the text 212 to be visible to the vehicle 220 even in a low visibility condition 240. A representation of the text 212 as reflected by the signal 224 on the plurality of retroreflectors 204 may be rendered by the vehicle 220 and displayed to a passenger on a display device. In some embodiments, the vehicle 220 may determine what the text 212 says using optical character recognition to identify the text 212 based on the reflected signal 226.

Figure 3A:
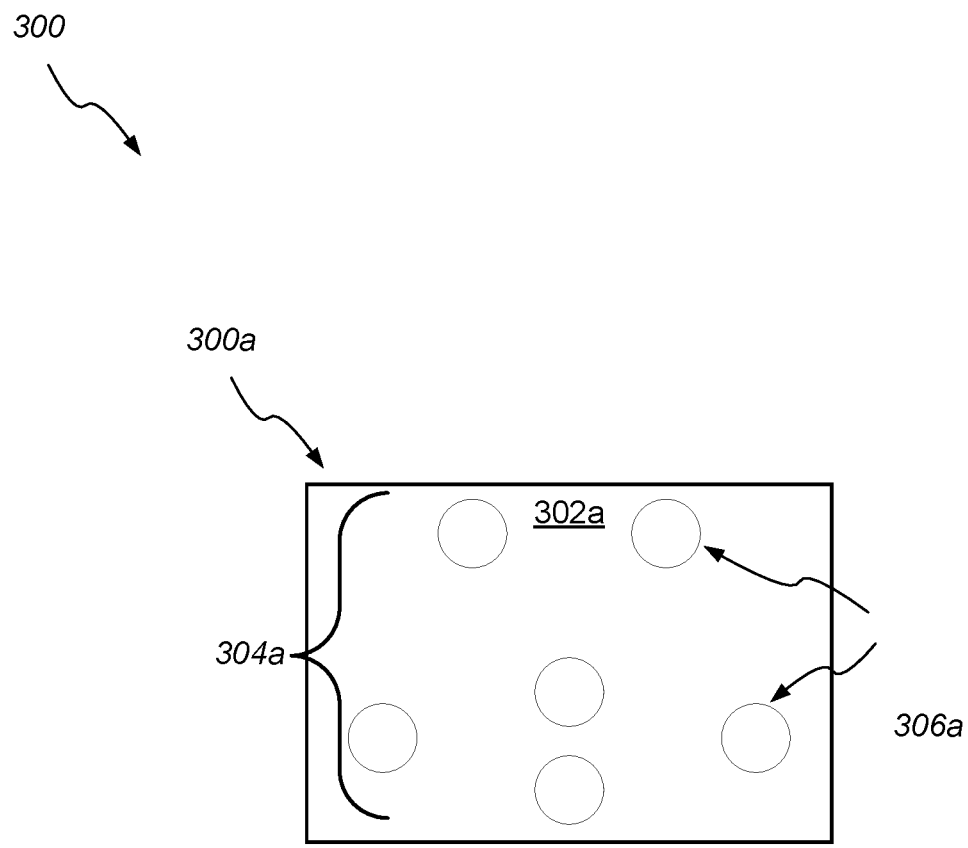
FIGS. 3a-b illustrate block diagrams of a vehicle having a pattern of a plurality of retroreflectors detectable from multiple angles.
Figure 3B:
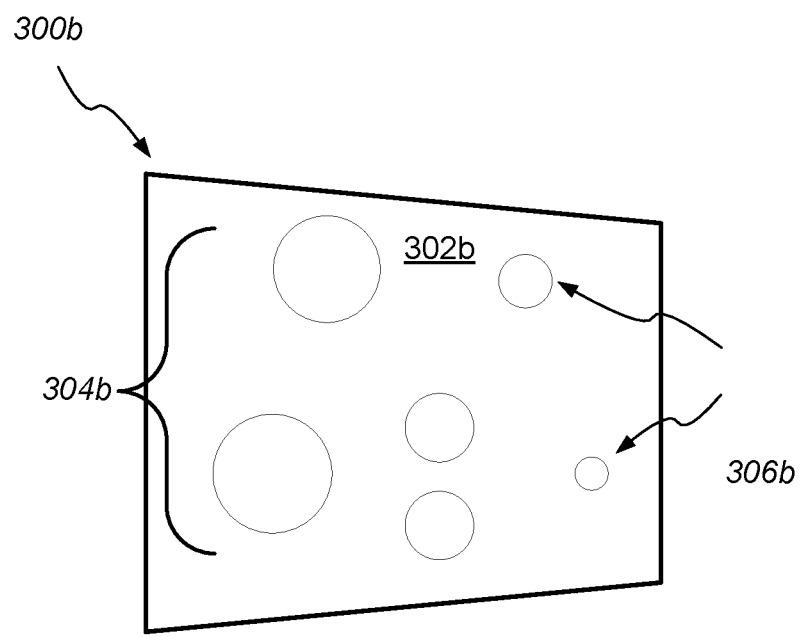

FIGS. 3a-b illustrate block diagrams of a vehicle 300 having a pattern 304a-b of a plurality of retroreflectors 306a-b as viewed from multiple angles 300a and 300b. FIG. 3a illustrates a first perspective view or a forward view 300a of a side of the vehicle 300, and FIG. 3b illustrates a second perspective view or a skewed view 300b of the side of the vehicle 300.

The pattern 304a-b of the plurality of retroreflectors 306a-b may be arranged and configured to identify the vehicle 300. In some embodiments, the pattern 304a-b may identify a particular side of the vehicle. Each reflector of the plurality of retroreflectors 306a-b may be a cluster of retroreflectors. The pluralities of reflectors 306a-b may include retroreflectors configured to reflect a signal from a signal source.

Each reflector or cluster of reflectors of the plurality of retroreflectors 306a-b may be positioned with space between each other reflector or cluster to improve visibility at long distances. For example, another vehicle may include one or more sensors configured to emit a signal to detect nearby obstacles, including the vehicle 300. The space between each cluster of reflectors may allow the one or more sensors of the other vehicle to distinguish between individual clusters. At longer distances, the relative space between each cluster is smaller from a perspective of the other vehicle. The one or more sensors may have a density of lidar signals that is greater than a density of the patterns 304a-b. In some embodiments, the pluralities of reflectors 306a-b may include extents to contain the reflectors 306a-c at outside corners of the vehicle 300 in order to provide object size sensing.

When the other vehicle has the skewed view 300b of the vehicle 300, an angle of illumination of the plurality of retroreflectors 306b may behave like a mirror. For example, a refractive index of the plurality of retroreflectors 306b may change with the angle of reflectivity. Based on the change of illumination or refractive index of a reflected signal, the other vehicle may determine a relative angle or parallax of the vehicle 300. In some embodiments, the plurality of retroreflectors 306b may include additional coding to indicate an angle at which the signal is reflected to or from. Such coding may be achieved by an interference pattern or a standing wave interference pattern, as described herein. In some embodiments, the other vehicle may detect that the relative spacing between each retroreflector of the plurality of retroreflectors 306b is different with respect to other retroreflectors. For example, the other vehicle may detect that a relative distance between a left retroreflector and a center retroreflector is greater than a relative distance between a right retroreflector and the center retroreflector. Supposing that the relative distances are designed to be equivalent, it can be calculated that the left retroreflector has a skewed angle relative to the right retroreflector. The relative distances may also be used to determine a distance to the vehicle 300 from the signal source (e.g., another vehicle). For example, a scale of the distance compared to an expected distance may indicate that the vehicle 300 is a proportional distance away from the other vehicle.

Figure 4:
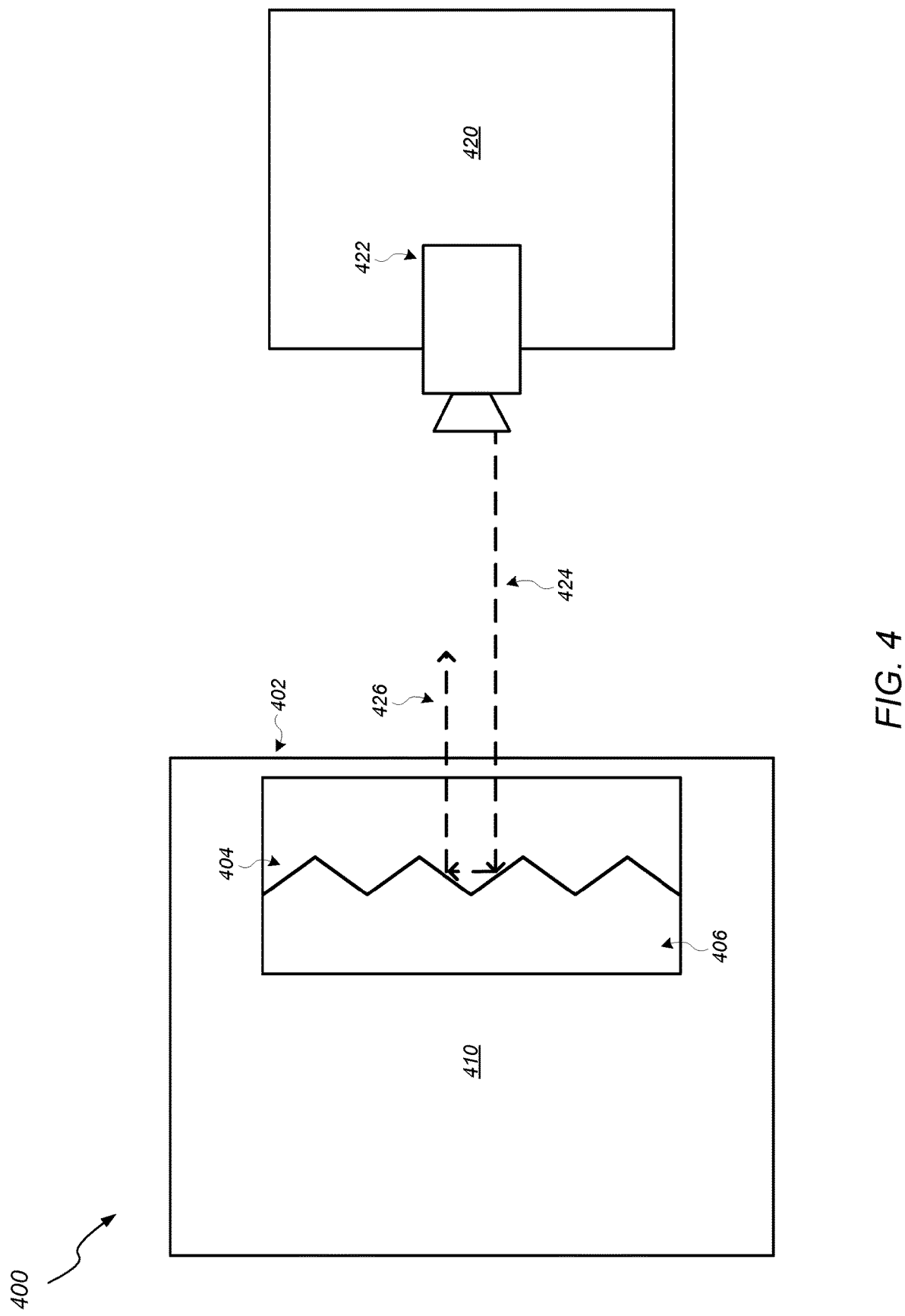
FIG. 4 illustrates a schematic diagram of a plurality of retroreflectors embedded in a bumper assembly of a vehicle.

As illustrated in FIG. 4, the retroreflector system 400 may alternatively be integrated in a bumper assembly of a vehicle. The outer body panel 402 may be coupled to the bumper assembly or embedded in an outer surface of the bumper assembly. For example, the outer body panel 402 may be integral to the bumper assembly such that it may be the outer surface of the bumper assembly. The plurality of retroreflectors 404 may be embedded in an internal portion of the bumper assembly. The internal portion of the bumper assembly may include an impact absorber 406. The impact absorber may be constructed from a material configured to be flexible in the event of an impact, such as foam or plastic. In some embodiments, the plurality of retroreflectors 404 may be disposed or embedded in the impact absorber during manufacturing of the impact absorber. In other embodiments, the plurality of retroreflectors 404 may be inserted into the impact absorber after the impact absorber is constructed. For example, the plurality of retroreflectors 404 may be added to the bumper assembly after the vehicle is assembled (e.g., an aftermarket modification). The plurality of retroreflectors 404 may be configured to not be optically visible outside of the vehicle when disposed or inserted into the impact absorber 406 because of the opacity of the impact absorber 406 and the outer body panel 402. For example, the impact absorber 406 and the outer body panel 402 may be constructed from an opaque material such that the plurality of retroreflectors 404 are obscured from a viewing perspective looking onto the vehicle 410.

Figure 5:
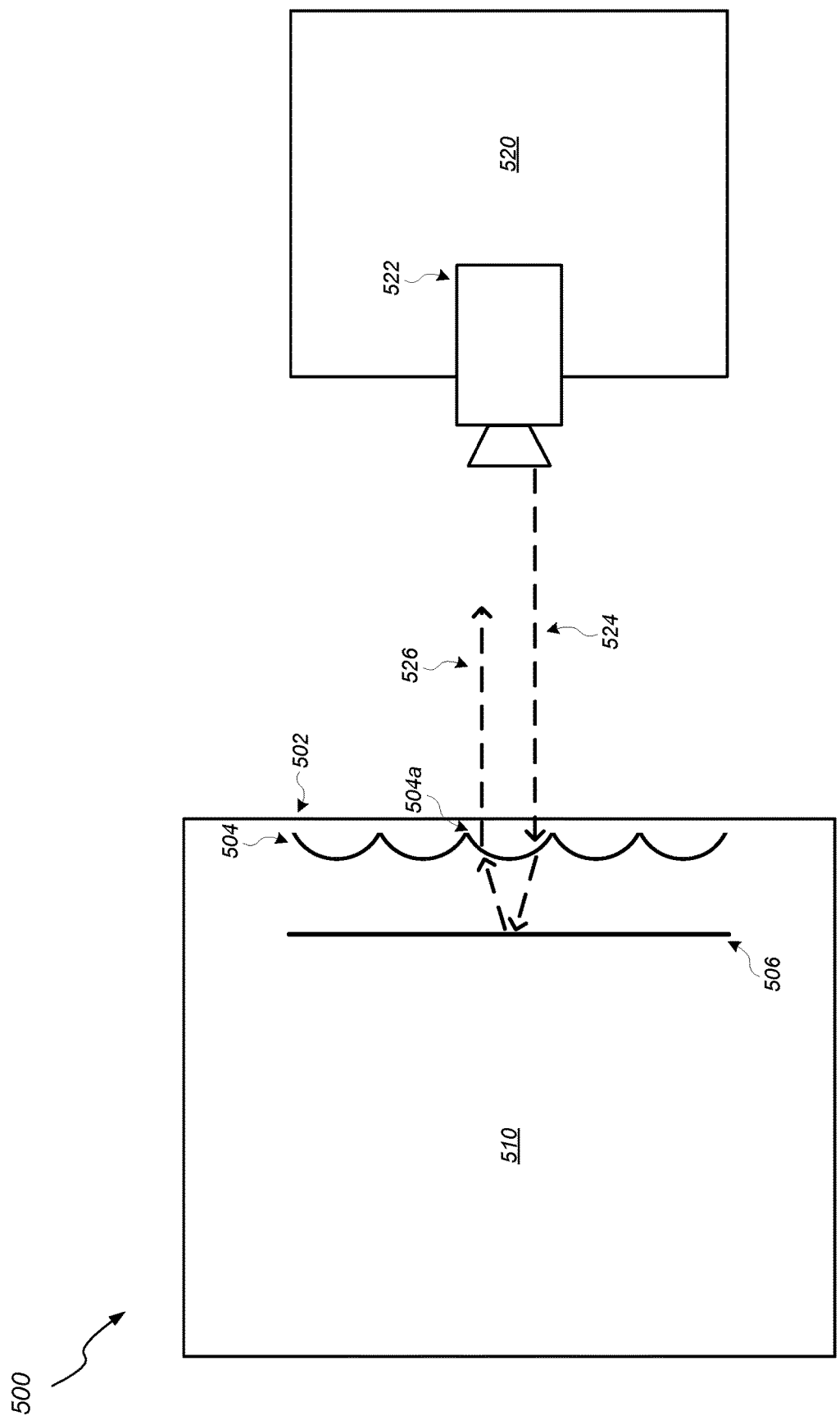
FIG. 5 illustrates a schematic diagram of a retroreflector system having an inner body panel and an outer body panel coupled to molded lenses.

FIG. 5 illustrates a retroreflector system 500 including an outer body panel 502 and an inner body panel 506 according to some embodiments. The outer body panel 502 may be coupled to or embedded in a vehicle 510. The outer body panel 502 may be coupled to a plurality of lenses 504. In a particular embodiment, the plurality of lenses 504 may be a back portion of the outer body panel 502. In another embodiment, the plurality of lenses 504 may be attached to the outer body panel 502. The retroreflector system 500 may also be referred to as a cats-eye retroreflector system.

The outer body panel 502 may be configured to allow a signal 524 from a signal source 522 to pass through to the plurality of lenses 504 with little to no disruption or distortion of the signal 524. In some embodiments, the signal source 522 may be another vehicle 520. The outer body panel 502 may be formed from a non-conductive material (e.g., a dielectric material) configured to minimize radio frequency or radar signal absorption for improved signal pass-through. The non-conductive material may be acrylonitrile butadiene styrene (ABS) plastic, polythene plastic, polyethylene plastic, polystyrene plastic, polyvinyl chloride plastic, a thermoplastic polymer, acrylic plastic, glass, or any combination thereof. The inner body panel 506 may be a reflective surface. In some embodiments, the inner body panel 506 may be formed from a metallic alloy. In other embodiments, the inner body panel 506 may be a rigid material covered by a conductive coating. For example, the inner body panel 506 may be formed from a plastic material that is covered by a metallic, conductive surface.

The plurality of lenses 504 may be molded to be convex lenses such that a convex lens 504a of the plurality of lenses 504 may have a focal point 508 located on the inner body panel 506. For example, the signal 524 may approach the convex lens 504a at a first inward angle. The convex lens 504a may cause the signal 524 to be directed to the focal point 508 at a first outward angle. In some embodiments, the convex lens 504 may cause all incoming signals to be directed to the focal point 508 regardless of corresponding inward angles. After directed by the convex lens, the signal 524 may approach the inner body panel at a second inward angle. The inner body panel 506 may be configured to create a reflected signal 526 by reflecting the signal 524 at a first outward angle such that the first outward angle and the second inward angle add up to 180° (e.g., a supplementary angle with respect to the second inward angle). The convex lens 504a may refract the reflected signal 526 at a second outward angle that is substantially similar to the first inward angle. In other words, the signal 526 is substantially parallel to the reflected signal 526 traveling toward the signal source 522.

Figure 6:
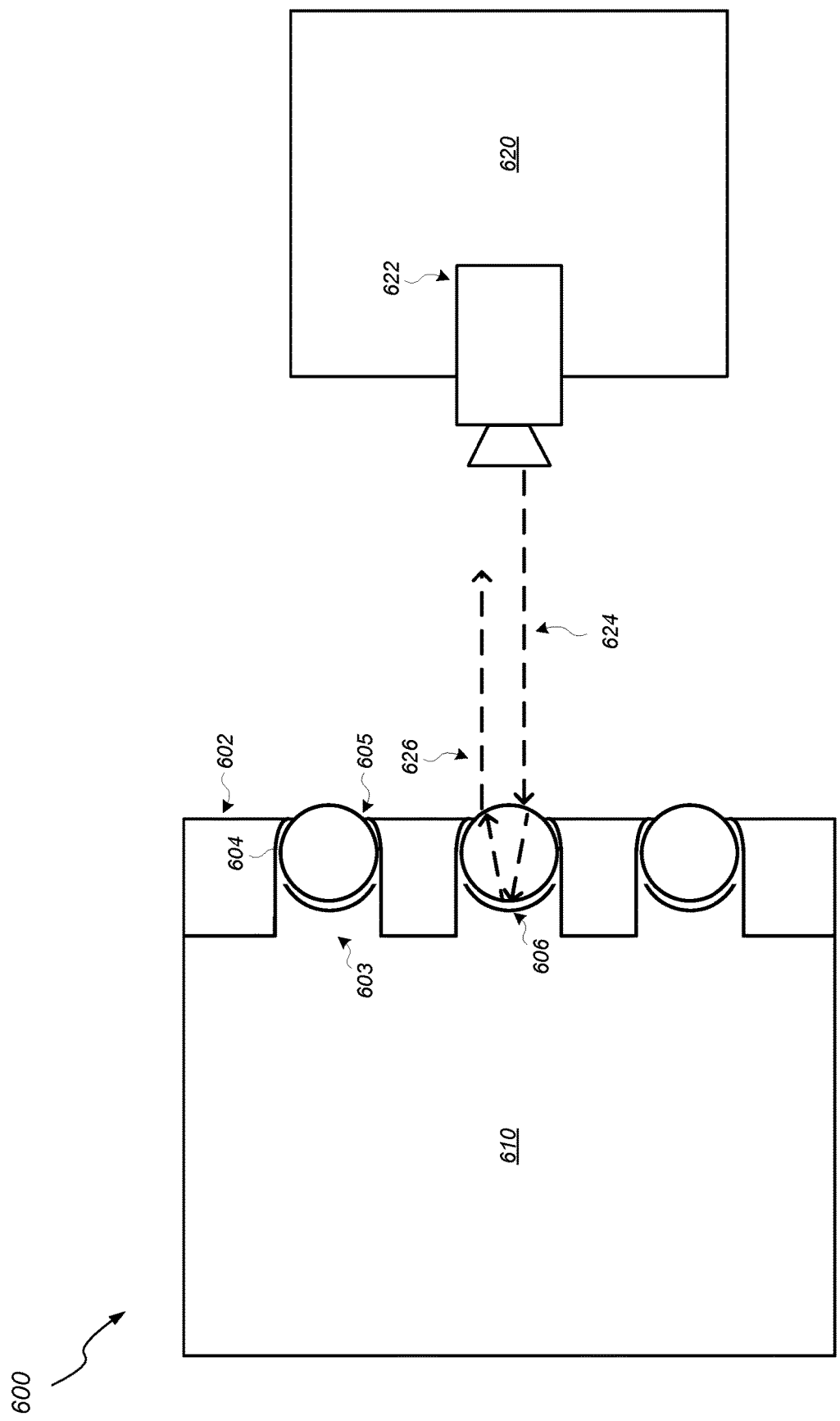
FIG. 6 illustrates a schematic diagram of a plurality of retroreflectors embedded in an outer body panel configured to reflect a signal with refractive spheres.

FIG. 6 illustrates a retroreflector system 600 including an outer body panel 602 and a plurality of refractive spheres 604 according to some embodiments. The outer body panel 602 may be coupled to or embedded in a vehicle 610. Each of the plurality of refractive spheres 604 may be at least partially embedded in the outer body panel 602. The plurality of refractive spheres 604 may be configured to reflect a signal 624 from a signal source 622 (e.g., a vehicle 620).

The outer body panel may include a plurality of extrusions 606 configured to house the plurality of refractive spheres 604. Each extrusion of the plurality of extrusions 603 may be at least partially rounded to accommodate a spherical shape corresponding to a refractive sphere of the plurality of refractive spheres 604. An extrusion may have an outer opening 605 configured to partially expose a portion of a refractive sphere through the outer body panel 602. The plurality of refractive spheres 604 may be bonded into the plurality of extrusions 603 to set the plurality of refractive spheres 604 in fixed positions. Each extrusion may have a depth where the depth may affect an acceptance angle that may cause the refractive sphere to actively reflect the signal 624 at near-normal incidence (e.g., level with the outer opening 605).

The plurality of refractive spheres 604 may be formed from a glass material or an optical grade polymer. Each refractive sphere of the plurality of refractive spheres may include a reflective layer 606 configured to reflect the signal 624 to the signal source 622 as a reflected signal 626. In some embodiments, the reflective layer 606 may be formed from a metallic alloy. In other embodiments, the reflective layer 606 may be a rigid material covered by a conductive coating. For example, the reflective layer 606 may be formed from a plastic material that is covered by a metallic, conductive surface. The reflective layer 606 may be coupled to the refractive sphere in situ (e.g., after setting the refractive sphere in an extrusion). Alternatively, the reflective layer 606 may be coupled to the refractive sphere prior to setting the refractive sphere in the extrusion.

Figure 7:
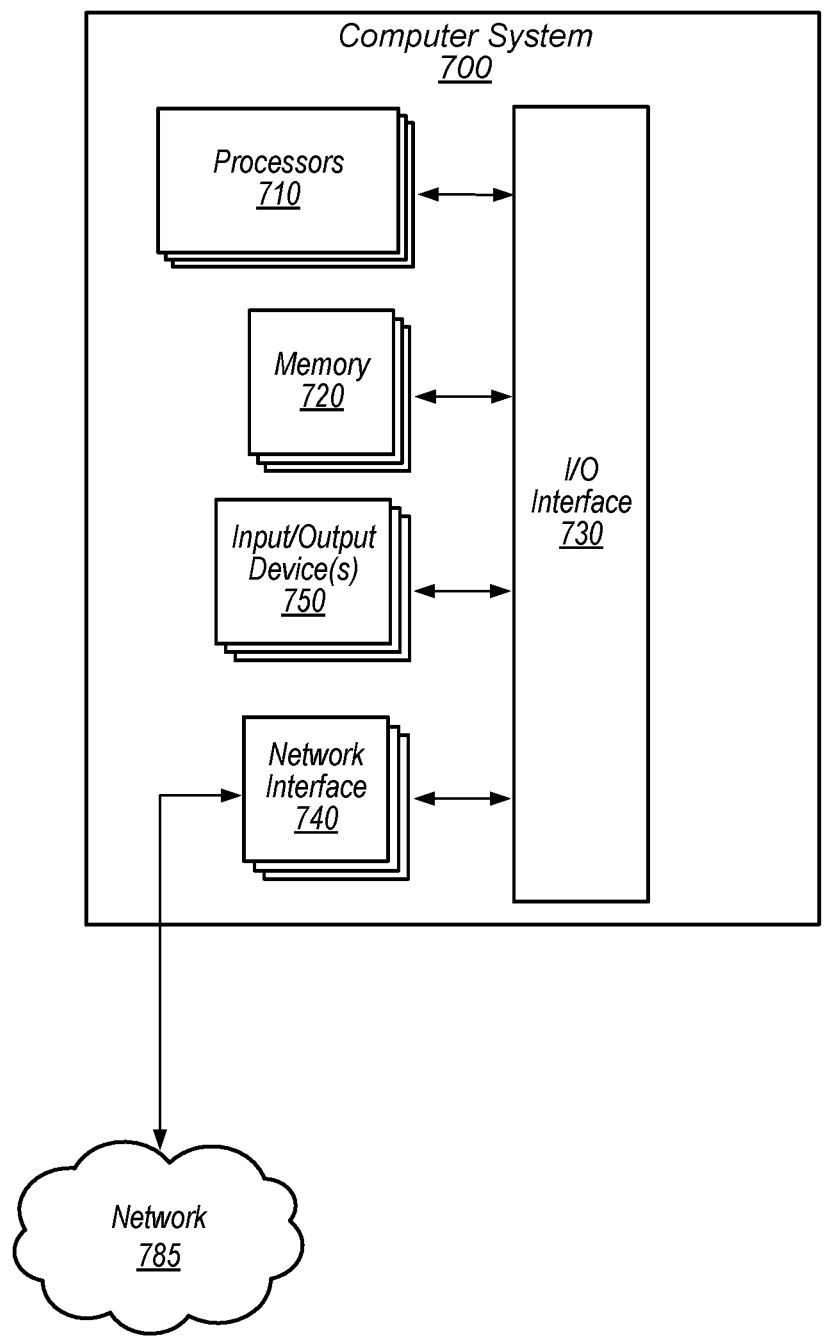
FIG. 7 illustrates an example computer system configured to implement one or more portions of a detection system, according to some embodiments.

FIG. 7 illustrates an example computer system 700 that may be configured to include or execute any or all of the embodiments described above. In different embodiments, computer system 700 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 700, which may interact with various other devices. Note that any component, action, or functionality described above with respect to FIGS. 1 through 6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices, which can include one or more user interface (also referred to as "input interface") devices. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions, data, etc. accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 720 may be configured to implement some or all of an ANS, incorporating any of the functionality described above. Additionally, existing control data of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous FIGs., any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   an outer body panel coupled to a vehicle, wherein the outer body panel comprises a visibly opaque material configured to allow a signal originating from an external signal source to pass through the outer body panel; and
   a plurality of retroreflectors embedded in the vehicle behind the outer body panel, wherein the plurality of retroreflectors is configured to reflect the signal through the visibly opaque material to the external signal source as a reflected signal, and wherein the plurality of retroreflectors is configured to have a reflectivity for a radar wavelength range or a light detection and ranging (lidar) wavelength range that is greater than a reflectivity for other wavelength ranges.

2. The system of claim 1, further comprising a bumper assembly of the vehicle, wherein the plurality of retroreflectors is embedded in the bumper assembly.

3. The system of claim 2, wherein the outer body panel is coupled to the bumper assembly, and wherein the plurality of retroreflectors is visibly hidden by the bumper assembly.

4. The system of claim 2, wherein the bumper assembly comprises an impact absorber, wherein the impact absorber comprises a foam material, and wherein the plurality of retroreflectors is integrated with the impact absorber.

5. The system of claim 1, wherein the plurality of retroreflectors comprises an array of corner cube retroreflectors.

6. The system of claim 1, further comprising an inner body panel configured to reflect the signal, wherein the plurality of retroreflectors comprises a plurality of lenses, wherein a particular lens of the plurality of lenses has a particular focal point on the inner body panel, and wherein the particular lens redirects the signal to the particular focal point.

7. The system of claim 6, wherein the inner body panel comprises a metallic alloy.

8. The system of claim 6, wherein the plurality of lenses is coupled to an inner portion of the outer body panel.

9. The system of claim 1, wherein the outer body panel comprises a plurality of extrusions, wherein the plurality of retroreflectors comprises a plurality of refractive spheres configured to reflect the signal, and wherein a particular refractive sphere of the plurality of refractive spheres is disposed in a particular extrusion of the plurality of extrusions.

10. The system of claim 9, wherein each extrusion of the plurality of extrusions comprises an opening configured to partially expose a corresponding refractive sphere, and wherein the particular refractive sphere is configured to receive the signal via a particular opening of the particular extrusion.

11. The system of claim 9, wherein each refractive sphere of the plurality of refractive spheres comprises:
    a reflective layer configured to reflect the signal; and
    an optical grade polymer.

12. The system of claim 9, wherein a depth of each extrusion of the plurality of extrusions corresponds to an angle of acceptance of the signal by a corresponding refractive sphere of the plurality of refractive spheres.

13. The system of claim 1, wherein the plurality of retroreflectors comprises a reflective element, wherein the outer body panel is configured to refract the signal to have a focal point at the reflective element.

14. The system of claim 1, wherein the signal comprises a non-visible signal, wherein the radar wavelength range is 0.3-200 cm, and wherein the lidar wavelength range is 780-1550 nm.

15. The system of claim 1, wherein the outer body panel includes a plurality of perforations, and wherein the plurality of retroreflectors is coupled to the plurality of perforations, and wherein each perforation of the plurality of perforations includes a polymer filler including a retroreflector of the plurality of retroreflectors positioned at a back portion of the polymer filler.

* * * * *